United States Patent [19]

Nagara

[11] 3,967,861
[45] July 6, 1976

[54] FLUID PRESSURE REGULATING VALVE FOR VEHICLE BRAKING SYSTEMS

[75] Inventor: Hiroaki Nagara, Kobe, Japan

[73] Assignee: Sumitomo Electric Industries, Ltd., Osaka, Japan

[22] Filed: May 5, 1975

[21] Appl. No.: 574,267

[30] Foreign Application Priority Data
May 10, 1974 Japan................................ 49-52732
Nov. 8, 1974 Japan............................ 49-129277
Nov. 8, 1974 Japan........................ 49-135859[U]

[52] U.S. Cl. .............................. 303/6 C; 188/195; 188/349; 303/22 R
[51] Int. Cl.² ......................... B60T 8/18; B60T 8/26
[58] Field of Search ................. 303/6 C, 6 R, 22, 24, 303/87; 188/349, 195; 138/30

[56] References Cited
UNITED STATES PATENTS

| | | | |
|---|---|---|---|
| 3,245,729 | 4/1966 | Shellhouse......................... | 303/24 F |
| 3,403,946 | 10/1968 | Thirion........................... | 303/24 F X |
| 3,430,660 | 3/1969 | Mitton............................ | 303/87 X |
| 3,736,031 | 5/1973 | Yabuta et al. ..................... | 303/6 C |
| 3,825,303 | 7/1974 | Yabuta............................ | 303/24 C X |
| 3,837,713 | 9/1974 | Masuda et al...................... | 303/22 R |

Primary Examiner—Trygve M. Blix
Assistant Examiner—Douglas C. Butler
Attorney, Agent, or Firm—Carothers and Carothers

[57] ABSTRACT

A reducing valve which performs proper vehicle braking control in proportional response to the load being carried on the vehicle by sealing off a hydraulic braking pressure, which is regulated to be proportional to the load on the vehicle, in a control chamber through the use of a control valve for the control of the pressure reducing function of the reducing valve. The control valve is regulated to remain open, in opposition to the applied hydraulic pressure from the braking pressure source, in proportion to the increase of vehicle load thereby correspondingly raising the reduction starting pressure of the reducing valve which reduces the braking hydraulic pressure to the rear wheel brakes of the vehicle. The reducing valve according to the present invention indirectly controls the reduction starting pressure by changing the hydraulic pressure of the control chamber which is proportional to the load on the vehicle thereby obtaining accurate operation without experiencing any of the various types of mechanical losses which accompany the change of mechanical forces observed with the conventional type reducing valve.

5 Claims, 5 Drawing Figures

FLUID PRESSURE REGULATING VALVE FOR VEHICLE BRAKING SYSTEMS

BACKGROUND OF THE INVENTION

Valves have been in use heretofore in vehicle rear wheel brake circuits for reducing the hydraulic braking pressure applied to the rear wheel brake cylinders such that it is less than that applied to the front wheel brakes, with the concept of preventing the rear wheels from being locked earlier than the front wheels to prevent skidding of the vehicle rear end. However, in reducing valves of the conventional type wherein the prevention of rear end skidding is limited to vehicles calculated to have a prescribed or preset amount of load, a drawback appears in that sufficient prevention of skidding cannot be expected if the vehicle load is lighter than said prescribed amount of load, and, on the other hand, the braking force will be found to be insufficient if the load is heavier than the prescribed amount. A load-responsive reducing valve is used in order to eliminate this drawback.

These load-responsive reducing valves may roughly be classified into two types, i.e., the load detection type and the deceleration detection type.

However, in the case of said load detection type wherein the sinking of the vehicle loading platform by the load or the hydraulic pressure generated by the load is directly transmitted mechanically to the reducing valve to modulate the performance of the reducing valve the line or direction of the applied force on the reducing valve is liable to change or become inclined and the reduction starting pressure is therefore liable to be changed irradically by the vibration of the vehicle due to the unevenness of the road surface or irregular sinking of the vehicle under braking. Furthermore, there has also been a drawback in that troublesome adjustment is required when equipping the vehicle with the device.

In the case of said deceleration detection type of pressure reduction valve, wherein an inertia-operated ball which starts to actuate the reducing valve when the deceleration of the vehicle reaches a predetermined value, and the response to the load is affected indirectly by means of a rise in hydraulic braking pressure at the time of increased load on the vehicle, it is not suitable for vehicles that are not sensitive to the difference in deceleration caused by different applied loads on the vehicle.

The present invention relates to a load-responsive reducing valve which has a means to correct the shortcomings of the reducing valves of said load detection type.

As for the aforementioned prior art reducing valves of the load detection type, U.S. Pat. No. 3,169,800 and U.S. Pat. No. 3,362,758 disclose known examples. As for the deceleration detection type, U.S. Pat. No. 3,317,251 discloses a known example.

A reducing valve wherein the pressure reducing plunger of the reducing valve is controlled by the hydraulic pressure of a control chamber is disclosed in Japanese Patent Application Laid-Open No. 49-37066 whose inventors include the inventor of the present invention.

SUMMARY OF THE INVENTION

The load-responsive reducing valves of the prior art rely on the regulation of the reduction starting pressure of the reducing valve by direct mechanical application of forces which are proportional to the load on the vehicle. As previously explained, such prior art systems experience inaccurate operation due to mechanical losses created in changes of the load applied mechanical forces to the regulating valve for the purposes of controlling the same due to rough road conditions or the like. It is a principle object of the present invention to provide a load-responsive reducing valve which responds indirectly to the load applied to the vehicle through the medium of a hydraulic control pressure which regulates the reduction starting pressure of the reducing valve in proportion to the load on the vehicle thereby eliminating the aforementioned disadvantages of the prior art reducing valves.

The present invention provides a load-responsive reducing valve for the rear wheel brake system of a vehicle wherein the reducing valve, which is provided for proportional reduction of the hydraulic braking pressure applied to the rear brakes of the vehicle at predetermined reduction starting levels, which reduction starting levels are in turn dependent upon the load which the vehicle is carrying, is regulated through a fluid medium. As in conventional type reducing valves, the reducing valve of the present invention is provided with a plunger which is operated in cooperation with a valve seat by the difference in area between the plunger surfaces receiving hydraulic pressure from a hydraulic pressure source and from the rear wheel brake respectively to open and close passage of hydraulic braking fluid from the hydraulic pressure source to the rear wheel brake system. A control chamber is provided in the reducing valve which is operable to store a controlling fluid pressure for pressing the plunger in the reducing valve in the direction required to open the same in order to control the starting pressure of the reducing operation of the reducing valve in response to the load on the vehicle. The load responsive reducing valve of the present invention is, however, provided with a control valve which opens and closes passage of hydraulic fluid from the hydraulic pressure source to the control chamber. The load applied to the vehicle is proportionally transmitted through a biased member or means which urges this control valve to remain open in a degree proportionate to the load on the vehicle which thereby correspondingly raises the reduction starting pressure of the reducing valve by controlling the hydraulic fluid pressure contained within the control chamber.

The means biasing the control valve preferably includes a spring which is urged in response to the load on the vehicle and thereby in turn urges the spindle of the control valve in the direction required to open the same. In addition, the braking hydraulic pressure supplied from the hydraulic braking pressure source which is independently supplied to the front wheel brake system of the vehicle is also applied to the spindle of the control valve in a direction of application so as to tend to close the same. Thus, when the front brake system fails due to a leakage, the control valve will not close until a higher pressure level is attained from the hydraulic pressure source that feeds the rear wheel brake system than would otherwise be experienced when the front wheel brake system was fully operable, thereby raising the reduction starting pressure of the reducing valve to increase the braking pressures applied to the rear wheel brake system in compensation for the loss occurring in the front brake system.

The load responsive reducing valve of the present invention may also preferably include a pressure buffer means which permits the capacity of the fluid control chamber to elastically expand in order to compensate for fluid pressure variations in the control chamber which may occur solely to the displacement of the reducing valve plunger within the chamber so that movement of the plunger within the control chamber will not adversely effect changes of the reduction starting pressure of the valve.

The spring member or means which transmits the vehicle load forces from the vehicle body to the control valve is preferably contained within a cylinder in order to prevent buckling of the spring member and to protect it from the elements.

The load-responsive reducing valve of the present invention is further characterized by the use of a flexible beam disposed in the mechanical transmission system of load forces from the vehicle body to the aforementioned spring (which in turn controls the operation of the control valve) in order to minimize the effects of unwanted outside mechanical forces to which the vehicle is subjected, such as from rough road conditions and the like, from being applied to the reducing valve through the mechanical portion of the system which detects the degree of load being borne by the vehicle load bed in order to prevent inaccurate sensing of the actual amount of load on the vehicle bed.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE INVENTION

Explanation of the First Example of Embodiment

Figure 1:
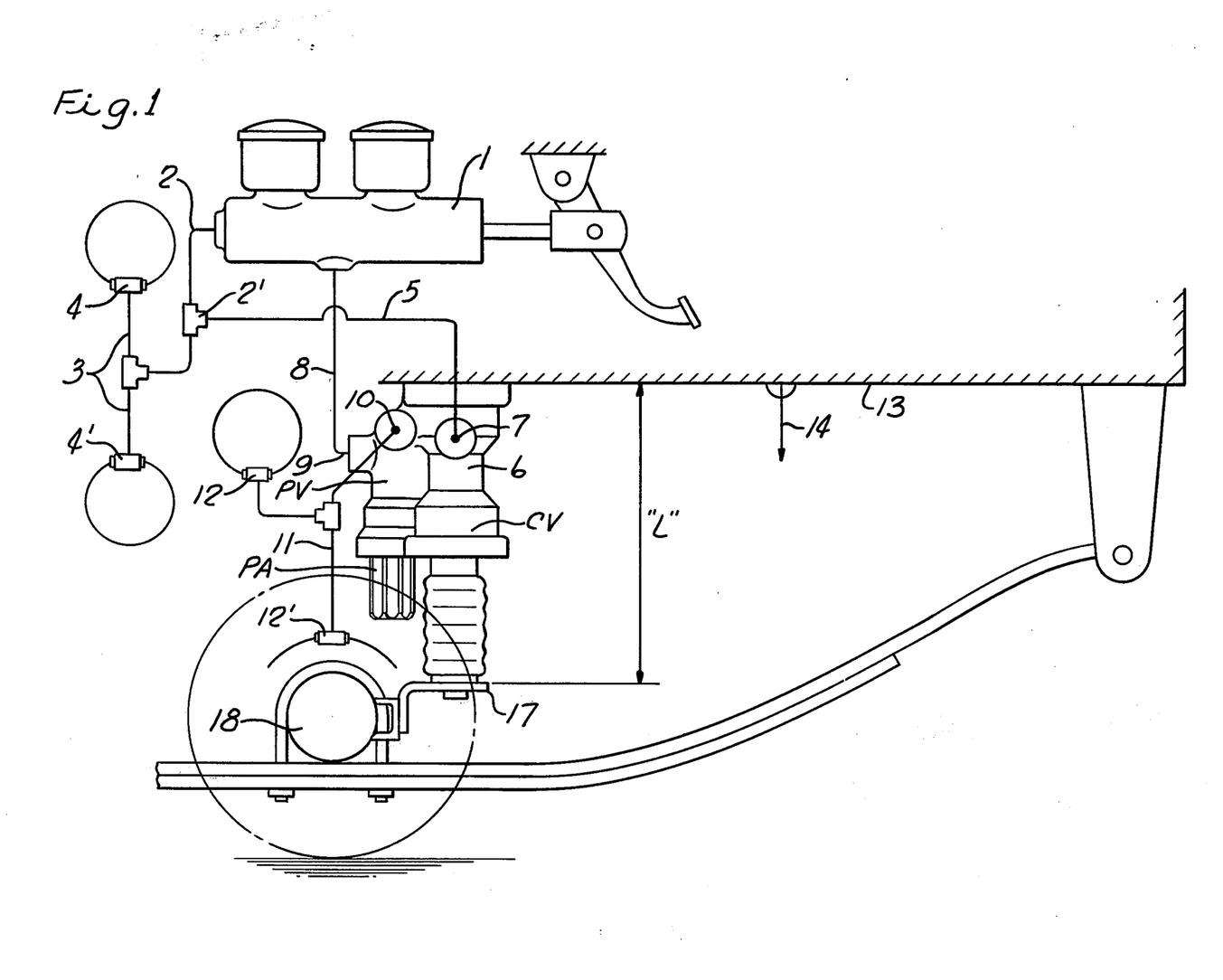
FIG. 1 is a diagrammatic view of the hydraulic braking pressure circuit of the present invention installed in a vehicle.
Figure 2:
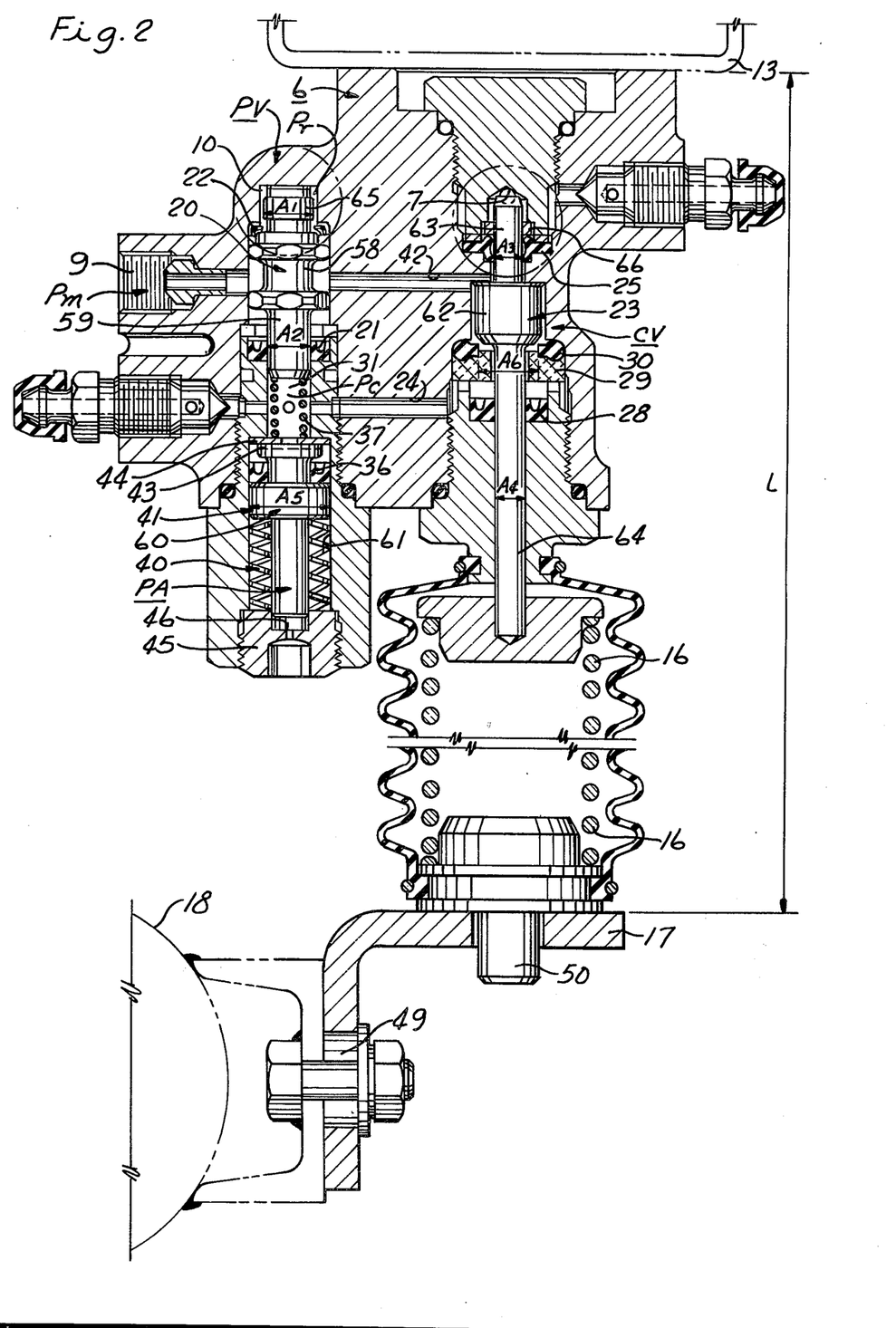
FIG. 2 is a cross-sectional view of one example embodiment of the reducing valve of the present invention.

The first example of embodiment is shown in FIG. 1 and FIG. 2. In this example, the reducing valve PV and the load-responsive control valve CV are incorporated into one body, and are installed between the loading platform 13 and the shelf 17 fixed to the rear wheel axle 18. The load on the loading platform 13 strains the leaf spring installed between the loading platform and the wheel axle 18 whereby the loading platform moves downwardly when under load in the direction of the arrow 14.

As a result of this lowering of the loading platform, the height "L" of the valve 6 as a whole becomes shorter. As a result of this contraction of L, the repulsive force of the load spring 16 shown in FIG. 2 increases and causes the control valve CV to be closed at a higher pressure, as described in greater detail hereinafter.

On the other hand, the braking hydraulic pressure is supplied to the two front wheel brakes 4 and 4' through the pipe 2, which comes from one end of the tandem master cylinder 1, and the pipes 3.

The pipe 8 which comes from another part of the tandem master cylinder 1 is connected to the inlet port 9 of the reducing valve PV, and, via this reducing valve PV, is connected to the rear wheel brakes 12 and 12' through the outlet port 10 and the pipes 11. The pipe 5, which branches from the pipe 2 by means of the joint 2' is connected to the inlet port 7 and, as explained later, properly adjusts the rear wheel braking at such time that the front wheel braking circuit develops a leak.

The reducing valve PV shown in FIG. 2 is provided with the plunger 20, which axially moves in the chamber 58 connecting the inlet port 9 and the outlet port 10 (not completely shown in the drawing) in accordance with the difference between the areas receiving the hydraulic pressure $P_m$ of the inlet port and the hydraulic pressure $P_r$ of the outlet port respectively, and the valve seat 22 which cooperates with the plunger 20 and opens and closes the passage between the inlet port and the outlet port to transmit the hydraulic pressure $P_m$ to the outlet port after reducing it.

The leg 59 of the plunger 20 has a cross sectional area $A_2$ and its circumference is slidably sealed with the cup seal 21. The cup seal 21 is formed in a ring having an upwardly open V-shaped cross-section and it acts as a check valve which blocks the passage of fluid when the hydraulic pressure $P_m$ in the chamber 58 is higher than the hydraulic pressure $P_c$ in the control chamber 31 and transmits the hydraulic pressure $P_c$ to the $P_m$ chamber when the condition is reversed.

Under leg 59 the control chamber 31 is provided in order to enable plunger 20 to move down. Hydraulic pressure $P_m$ is transmitted from the chamber 58 through passage 42, open control valve CV and passage 24.

Below control chamber 31 cylinder 61, having a larger diameter than control chamber 31 and a cross-sectional area $A_5$, is provided. The slidable piston 41 is inserted into this cylinder.

The central part of the piston 41 is provided with piston part 60 which has a diameter slightly smaller than that of the cylinder, and cup seal 36 rests upon this piston part. The end plug 45 is screwed into the lower end of the cylinder 61 and the dish spring 40 is interposed in a compressed condition between the end plug 45 and the piston part 60. This dish spring 40 urges the uppermost head of piston 41 against the washer 44. The V-shaped groove 43 is provided at the uppermost end or head of the piston 41 such that control chamber 31 communicates to the cup seal 36 provided on the piston part 60 via the central hole of the washer 44 and the V-shaped groove 43.

The lowest end of the piston 41 is inserted with clearance into the inner bottom 46 of the end plug 45 which communicates with the outer atmosphere.

The assembly shown under said washer 44 in FIG. 2, is not always required for a reducing valve PV, but, as described later, constitutes a pressure buffer PA for improving the performance of the reducing valve PV during the pressure reducing operation.

Next, the control valve CV shown in the right half of FIG. 2 will be explained.

The valve spindle 23 which constitutes the main body of the control valve CV consists of the valve flange 62, the upper spindle 63 extending upward therefrom and having a cross-section area $A_3$ and the lower spindle 64 extending downward and having a cross-section area $A_4$. Since the upper spindle 63 is slidably sealed with the Y-seal 25, the hydraulic pressure $P_m$ of the inlet port 7 is received by the cross-sectional area $A_3$. The lower spindle 64 is slidably sealed with the cup seal 28 and its lowest end is pushed up by the load spring 16.

Under the valve flange 62 the valve seat 30 is fixed by means of the backup ring 29, and when the valve spindle comes down, the flange 62 engages the seat to block the communication of the passages 42 and 24.

Operation of the First Example

The hydraulic pressure $P_m$ in the passages 42 and 24 are equal when the valve flange 62 and the valve seat 30 are separated, and the force of $P_m \cdot A_4$ acts on the valve spindle 23 (it is assumed that $A_3$ and $A_4$ are equal).

If the hydraulic pressure $P_m$ of the master cylinder 1 rises, the hydraulic pressure $P_m$ from the inlet port 7 acts on the sectional area $A_4$ and overcomes the set load F of the spring 16, when the spindle 23 begins to come down. When the hydraulic pressure of $P_m$ reaches the value of $$P_m = \frac{F + K \cdot \Delta l}{A_4} \quad (1)$$

where
K : spring constant of the load spring 16
$\Delta l$ : amount of displacement of the valve spindle 23,
the valve spindle 23 displaces downwardly $\Delta l$ and closes the passage between the valve seat 30 and the valve flange 62, so that the hydraulic pressure $P_m$ transmitted from the inlet port 9 to the passage 42 is not thereafter transmitted to the passage 24 and the hydraulic pressure $P_c$ of the control chamber 31 will be maintained at about the value of $P_m$ at that time.

The reducing valve PV does not operate until this point of time. If the hydraulic pressure $P_m$ increases further after the closing of the valve seat 30, the hydraulic pressure $P_m$ which pushes down the sectional area $A_2$ of the plunger leg 59 becomes larger than the hydraulic pressure $P_c$ which pushes up the sectional area $A_2$ of the plunger leg 59.

Spring 37 is interposed between leg 59 and washer 44 with a small set load $f$ and a small spring constant $k$.

Consequently, although the plunger 20 comes down as $P_m$ rises further, the hydraulic pressure $P_m$ continues to be transmitted to the rear wheel cylinder until the plunger head 65 closes the valve seat 22.

Figure 3:
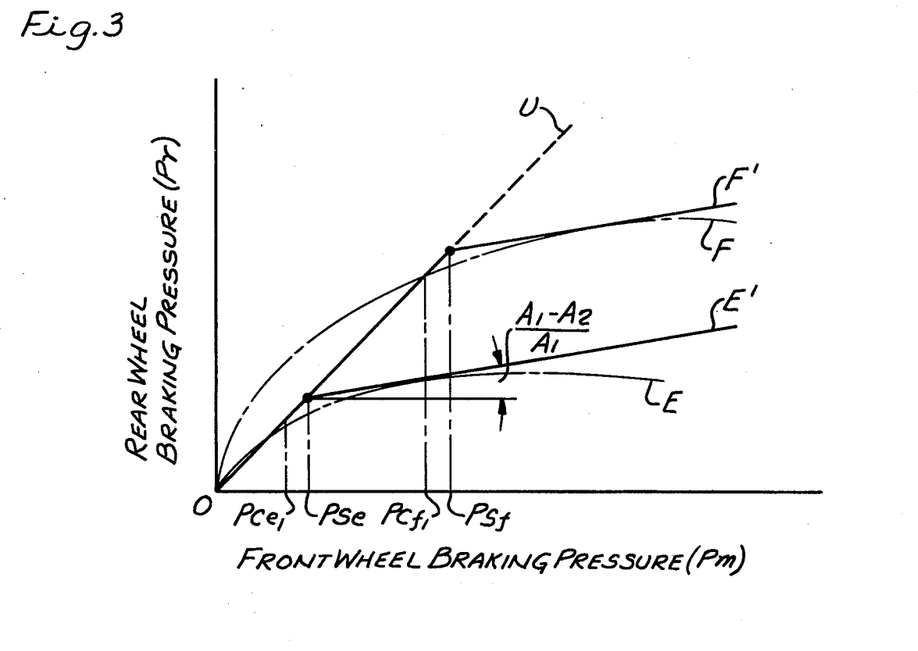
FIG. 3 is a graph showing the relationship between front wheel braking pressure and rear wheel braking pressure for the purpose of elucidating how the reducing valve of the present invention functions.

That is to say, $P_r$ rises along the line O – U of FIG. 3. When the plunger 20 comes down for the distance $\Delta X$ and closes the valve seat 22, the rear wheel hydraulic pressure $P_r$ is applied to the closed sectional area $A_1$ in the direction so as to push down the plunger 20. On the contrary, the force $f + k\Delta X$ of the spring 37, the force of hydraulic pressure $P_m$ of $P_m (A_1 - A_2)$ and the force of $P_c A_2$ work in the direction to push the plunger 20 up.

Consequently, the plunger 20 is balanced in accordance with the following formula when the valve seat 22 is closed.

$$P_r \cdot A_1 = P_m \cdot (A_1 - A_2) + P_c \cdot A_2 + (f + k\Delta X)$$

Hence, formula (2) is obtained from formula (1).

$$P_r = \frac{A_1 - A_2}{A_1} \cdot P_m + \frac{A_2}{A_1 \cdot A_4}(F + k\Delta l) + \frac{1}{A_1}(f + k\Delta X) \quad (2)$$

The reducing valve PV transmits the pressure $P_r$ to the rear brakes reduced in accordance with this formula (2).

Here F is the set load of load spring 16, as already mentioned. As it becomes higher in proportion to the load on the vehicle, the pressure $P_r$ of formula (2) also becomes higher in proportion thereto.

When the hydraulic pressure $P_m$ of the master cylinder rises and reaches the value $P_{ce}$ of FIG. 3, the valve seat 30 of the control valve CV is closed. When $P_m$ rises further, the plunger 20 comes down and the reducing valve PV acquires the balance of formula (2) when $P_m$ becomes $P_{se}$. Consequently, when $P_m$ rises further, the plunger 20 performs an opening-and-closing movement and $P_r$ increases in accordance with the straight line E' having the gradient $A_1 - A_2/A_1$, performing a braking operation approximately that of the ideal curve E for braking hydraulic pressure for front and rear wheels for a vehicle with a light load. Likewise, in the case of a fully loaded vehicle, the valve seat 30 is closed when $P_m$ becomes $P_{cf}$ and the valve seat 22 is closed when it becomes $P_{sf}$, and $P_r$ rises thereafter in accordance with the straight line F'. The curve F is the ideal curve for a fully loaded vehicle.

As is obvious from formula (2), the straight line E' moves in parallel up to the straight line F' in accordance with the load of the load spring 16 which is proportional to the load on the vehicle, effecting a load-responsive proportioning pressure reduction.

When $P_m$ reduces from a value on a straight line E' or F', it does not follow formula (2). That is to say, if the hydraulic pressure $P_m$ applied to the area difference ($A_1 - A_2$) decreases, the balance of plunger 20 according to formula (2) is broken and plunger head 65 comes down further while maintaining the closed relation with valve seat 22, so that the volume on the side of the outlet port 10 increases and $P_r$ also decreases in accordance therewith. If $P_m$ decreases further and becomes less than $P_r$ the liquid on the side of the outlet port 10 flows around the outer circumference of the valve seat 22 into the chamber 58, and after that $P_r$ decreases with $P_m$.

On the other hand, the closed valve seat 30 of the control valve CV is opened by having the valve spindle 23 raised when $P_m$ becomes approximately the value given by formula (1).

However, if the aforementioned plunger 20 comes down while the valve seat 30 is closed the hydraulic pressure $P_c$ in the control chamber 31 rises. Since this rise of the hydraulic pressure $P_c$ unfavorably affects the performance of the reducing valve PV, the pressure buffer PA is provided for the purpose of alleviating this rise of $P_c$. Since the sectional area $A_5$ of the cylinder 61 has the hydraulic pressure $P_c$ applied thereto, if $P_c$ increases due to the coming down of the plunger 20, the piston 41 and cup seal 36 come down compressing the dish spring 40. Thus, the increase of $P_c$ is alleviated by the increase of the volume of the control chamber 31 caused by this downward displacement. As is clear from this function, the pressure buffer PA may be provided anywhere if it is capable of increasing the whole volume connected to the control chamber 31. From a manufacturing point of view, however, it is convenient to provide it at the location shown in FIG. 2.

If the spring 37 is not provided, the plunger 20 will remain in the valve seat 22 even when the hydraulic pressure $P_m$ has been reduced back to zero. The spring 37 is provided for the purposes of preventing this.

As is clear from formula (2), the existence of the spring 37 has no particular object with respect to the performance of the reducing valve PV, and therefore its set load $f$ and spring constant $k$ are selected to be as small as possible while enabling the plunger head 65 to overcome the friction of the valve seat 22 and move.

The control valve CV is also provided with various devices. The hydraulic pressure $P_m$ of the inlet port 7 connected to the master cylinder of the front wheel system is equal to the hydraulic pressure of the inlet port 9. In consequence, the force $P_m \cdot A_3$ is applied to the sectional area $A_3$ of the upper spindle 63 of the valve spindle 23 to press the valve spindle 23 downward. In case leakage has occurred in the front wheel system, this force ceases to work, and, if $A_4 \geq A_3$ in formula (1), $P_m$ becomes $$P_m = \frac{F + k\Delta l}{A_4 - A_3} \quad (3)$$

If formula (3) is compared with formula (1), the denominator is smaller in formula (3), provided that the set load of the load spring 16 is constant, so that the hydraulic pressure $P_m$ for contacting the valve spindle 23 with the valve seat 30 becomes naturally higher when the hydraulic pressure of the inlet port 7 is absent. By this arrangement the hydraulic pressure of the inlet port 9 is transmitted to the outlet port 10 without being reduced, so that it is possible to set the required treading force for the driver at a low pressure to produce the entire necessary braking force by means of the rear wheel brake system alone in case the front wheel brake system has developed leakage.

The Y seal 25 is provided for the purpose of preventing the hydraulic pressure $P_m$ on the side of passage 42 from flowing out in case leakage has occurred in the brake circuit for the front wheel system such that the hydraulic pressure of inlet port 7 has reduced. In connection with this, the washer 66 is provided near the inlet port 7 side of the Y seal 25 in order to prevent the Y seal from becoming buckled by a difference in hydraulic pressure such that the hydraulic pressure $P_m$ is permitted to flow into the inlet port 7.

Details about this Y seal 25 are disclosed in U.S. Pat. No. 3,736,031.

Furthermore, this control valve CV is characterized in that the backup ring 29 is provided under the valve seat 30. After the valve seat 30 is closed with the flange 62, the still rising hydraulic pressure $P_m$ is applied to the sectional area $A_6$ and the valve spindle 23 tends to come down further.

If this downward displacement is permitted, the control chamber 31 and space connected thereto become smaller and $P_c$ undesirably rises further than the expected value.

In order to eliminate this drawback, the central part of the backup ring 29 protrudes into the valve seat 30, so that as soon as the valve seat 30 is closed, the flange 62 contacts it and prevents further descent.

Now, however, when the control valve of this embodiment is installed on a vehicle, it is difficult to align the central axis Y — Y of the lower spindle 64 and the central axis X — X of the spring supporter 50. When installing it on a vehicle in which it is difficult to obtain parallelism between the loading platform 13 and the support 17, it is a troublesome task to set the L dimension. The load on spring 16 is not transmitted to the lower spindle 64 as expected, because of the above-mentioned reasons. To overcome this drawback, the following second example of embodiment is recommended.

Explanation of the Second Example of Embodiment

Figure 4:
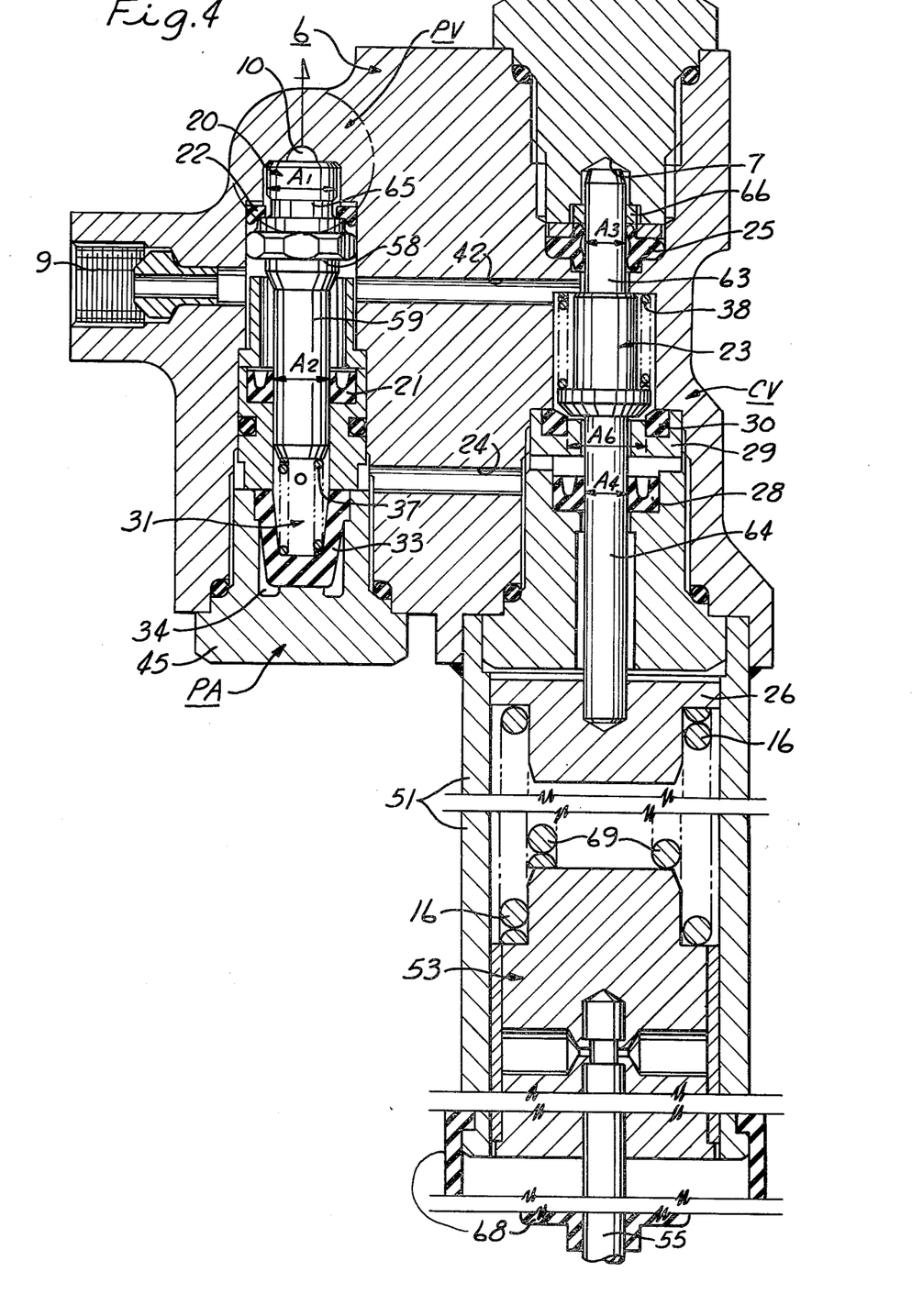
FIG. 4 is a cross-sectional view of a second example embodiment of the reducing valve of the present invention.
Figure 5:
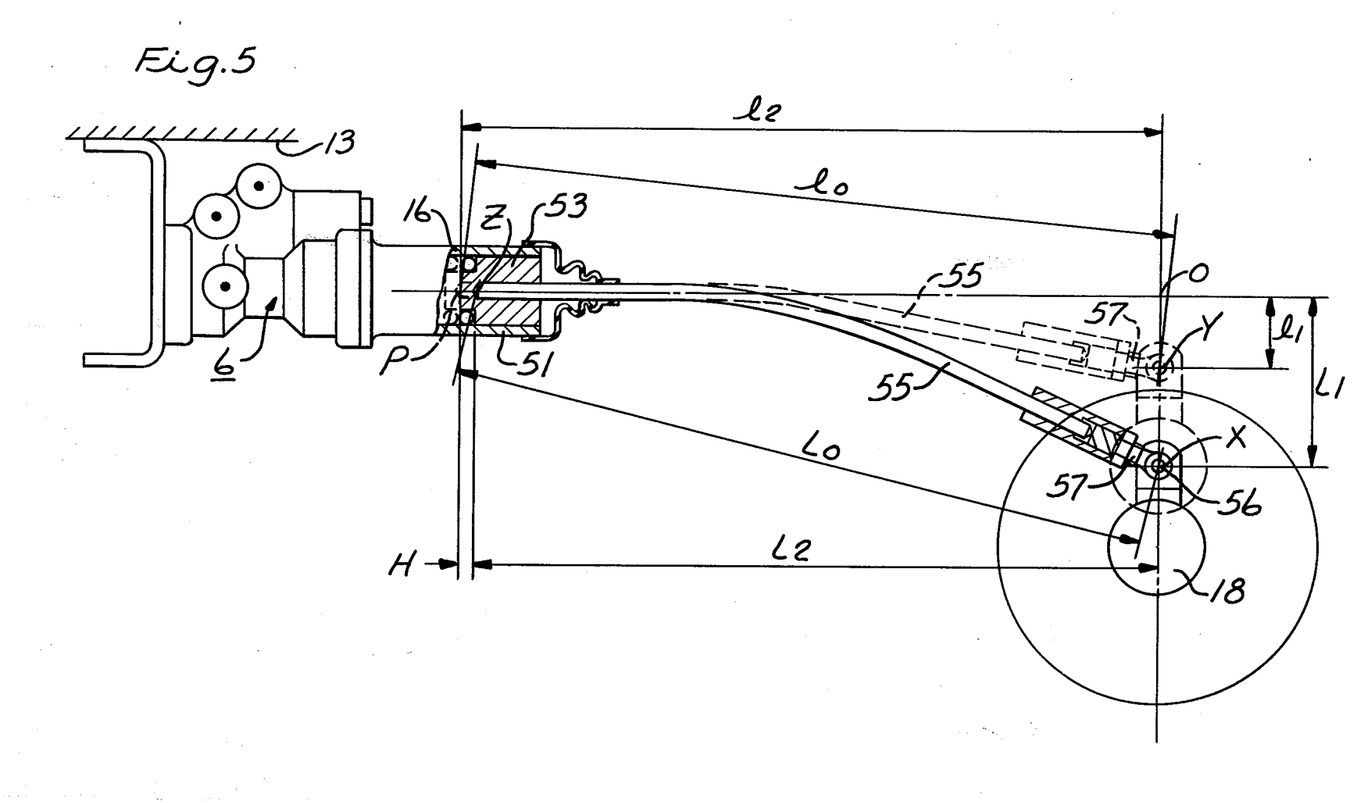
FIG. 5 is a diagrammatic view illustrating the relative position of the valve of the second example with respect to the rear wheel axle as installed in a vehicle.

The second example shown in FIG. 4 overcomes the aforementioned drawback. The load-responsive reducing valve of the second example is attached to the loading platform 13 as shown in FIG. 5, and is connected to the beam 55 which is attached by means of the eye-bolt 57 to the support installation center 56, attached in turn to the rear wheel axle 18.

Let X denote the position of the beam installation center 56 at the time of light load, Z the end of the beam 55 as inserted in the spring support 53 and O the intersection of the horizontal center line of the beam 55 and the vertical center line of the rear wheel axle. Then, the length of one side $L_2$ of $\Delta ZOX$ is $L_2 = \sqrt{L_0^2 - L_1^2}$. Likewise, let Y denote the position of the beam installation center 56 at the time of heavy load, and P the end of the beam 55 as inserted in the spring support 56. Then, the length of one side $l_2$ of $\Delta POY$ is $L_2 = \sqrt{l_0^2 - l_1^2}$. Assuming that the beam 55 is made of a material which has sufficient buckling strength and bending strength, then it follows that $l_0 \doteq L_0$. Hence, the change in dimension in the horizontal direction is:
$$H \doteq \sqrt{L_1^2 - l_1^2}$$

Utilizing the change in this dimension H, the repulsive force of the load spring 16, or in some cases the auxiliary spring 69, is increased and the closing of the control valve CV is caused to take place at a higher pressure, as described in the first example.

The spring support 53 for the springs 16 and 69 (see FIG. 4) functions to increase the compression of the load spring 16 and auxiliary spring 69, but will not decrease it. Consequently, if the end of the spring support 53 is positioned on the same plane as the end of the cylinder 51, it is possible to adjust the pressure reducing action to the degree required at the time the vehicle equipped with this valve is without any load on the loading platform. Then the adjustment for the vehicle without any load can be automatically completed merely by installing the beam on the support 56 on the rear wheel axle 18 with adjustment of the eye-bolt 57 so that the end of the support 53 lightly touches the load spring 16. It is thus unnecessary to go through such troublesome operations as the measuring of dimensions and the measuring of the installation load of the spring which would have been necessary with the conventional type employing a link mechanism.

Furthermore, the phenomenom of buckling of the spring 16 which is liable to occur at the time of its maximum contraction can be prevented as a result of housing the load spring in the cylinder 51.

Moreover, if the load springs are exposed to the outer atmosphere in a cold climate or the like, a difficulty often takes place in that the specified installation load cannot be obtained as a result of icing, attaching of snow, etc. However, this difficulty can be eliminated by encasing the spring with the cylinder 51 and further isolating it from the outside by means of the cover 68.

Another characteristic of the second example is that the construction of the pressure buffer PA is different from that of the first example. That is to say, it is different in that a conical oil pocket 33 made of an elastic material is used in place of the piston 41, cup sal 36 and dish spring 40 of FIG. 2.

In this oil pocket 33 the same spring 37 as that of the first example is provided so that control pressure PC may be stored in this control chamber 31, but the braking oil is prevented from entering the air chamber 34 on the outside of the oil pocket 33. The same effect of a pressure buffer PA as that in the first example can be obtained by the use of this simple construction.

It is also different from the first example in that a spring 38 is provided on the spindle 23 of the control valve, as shown in FIG. 4. This is provided for the purpose of eliminating the sliding resistance of the Y seal 25 and cup seal 28, and its installation load is far smaller than the installaton load of the load spring 16 which acts on the spindle 23 via the spring holder 26.

The auxiliary spring 69 placed inside the load spring 16 is so constructed as to push the spring holder 26 only after the load spring 16 has become well compressed, and, as a result of this, the control valve CV is required to act in direct proportion to the load on the vehicle, notwithstanding that the sinking of the loading platform is not in direct proportion to the load on the platform. This, of course, is an improvement in the second example which is not found in the first example.

Except for the above-mentioned differences, the valve shown in FIG. 4 operates, for the most part, in the same manner as that of the first example.

I claim:

1. A load-responsive reducing valve for the rear wheel brake system of a vehicle comprising a reducing valve having a valve plunger therein operated in cooperation with a valve seat by the difference in area between the plunger surfaces receiving hydraulic pressure from a hydraulic pressure source and from a rear wheel brake respectively to open and close the passage of braking fluid from the hydraulic pressure source to the rear wheel and a control chamber operable to store a controlling pressure for pressing said plunger in the direction to open said plunger from said valve seat and to control the starting pressure of the reducing operation of said reducing valve in response to the load on the vehicle, characterized by a control valve including a valve spindle which opens and closes the passage of fluid from the hydraulic pressure source to said control chamber, bias means urging said control valve to remain open in proportion to the load on the vehicle and thereby correspondingly raise the reduction starting pressure of said reducing valve, said bias means including a spring urged in response to the load on the vehicle and in turn urging said spindle in the direction required to open said control valve in response to the load on the vehicle.

2. A load-responsive reducing valve as claimed in claim 1, wherein the braking hydraulic pressure supplied from a source to the front wheel brake of the vehicle is applied to said spindle in the direction to close said control valve.

3. A load-responsive reducing valve as claimed in claim 1, including pressure buffer means which enables the capacity of said control chamber to expand elastically.

4. A load-responsive reducing valve as claimed in claim 1, wherein said spring which presses said spindle is contained in a cylinder.

5. A load-responsive reducing valve as claimed in claim 4, wherein said spring is compressed through the means of a flexible beam in proportion to the sinking of the vehicle loading platform due to the load thereon.

* * * * *

UNITED STATES PATENT OFFICE
CERTIFICATE OF CORRECTION

PATENT NO. : 3,967,861
DATED : July 6, 1976
INVENTOR(S) : Hiroaki Nagara

It is certified that error appears in the above-identified patent and that said Letters Patent are hereby corrected as shown below:

In the drawings:

Fig. 2, the lead line for reference numeral 58 should be slightly shortened to indicate the open chamber as opposed to the plunger 20;

a short vertical dashed line having the reference letter Y appearing at opposite ends thereof should be positioned along the axis of spindle 64;

a short vertical dashed line having the reference letter X appearing at opposite ends thereof should be positioned along the axis of the cylindrical supporter 50.

Fig. 4, the lead line for reference numeral 58 should be shortened to indicate the open space of the chamber as opposed to the plunger 20;

inlet port 7 should be indicated by a small central circle and a concentric larger dashed circle such as appears similar to inlet port 7 as illustrated in Fig. 2.

Signed and Sealed this

First Day of March 1977

[SEAL]

*Attest:*

RUTH C. MASON
*Attesting Officer*

C. MARSHALL DANN
*Commissioner of Patents and Trademarks*